United States Patent [19]

Lassiter et al.

[11] Patent Number: 4,690,847

[45] Date of Patent: Sep. 1, 1987

[54] COLD WEATHER GARMENT STRUCTURE

[75] Inventors: B. Dean Lassiter; Vincent F. Ambrosiani, both of Greensboro, N.C.

[73] Assignee: Burlington Industries, Inc., Greensboro, N.C.

[21] Appl. No.: 879,053

[22] Filed: Jun. 26, 1986

[51] Int. Cl.$^4$ .......................... B32B 3/26; B32B 5/18
[52] U.S. Cl. ........................................ 428/71; 428/76; 428/159; 428/160; 428/166; 428/175; 428/177; 428/178; 428/180; 428/246; 428/251; 428/286; 428/304.4
[58] Field of Search ................... 428/71, 76, 161, 162, 428/163, 166, 174, 179, 304.4, 316.6, 102, 158, 159, 160, 172, 175, 177, 178, 180, 286, 246, 251

[56] References Cited

U.S. PATENT DOCUMENTS

| | | | |
|---|---|---|---|
| 2,194,364 | 3/1940 | Minor | 428/159 |
| 2,768,924 | 10/1956 | Wright | 428/76 |
| 2,897,508 | 8/1959 | Bashore et al. | 2/93 |
| 3,219,514 | 11/1965 | De Roysancour | 2/272 |
| 3,577,305 | 5/1971 | Hines et al. | 2/272 |
| 3,940,811 | 3/1976 | Tomikawa et al. | 428/179 |
| 4,104,430 | 8/1978 | Fenton | 428/246 |
| 4,136,222 | 1/1979 | Jonnes | 428/116 |
| 4,185,327 | 1/1980 | Markve | 2/2 |
| 4,469,736 | 9/1984 | Machholz | 428/159 |
| 4,525,406 | 6/1985 | Pollock | 428/137 |
| 4,533,583 | 8/1985 | May | 428/69 |
| 4,550,046 | 10/1985 | Miller | 428/116 |
| 4,583,247 | 4/1986 | Fingerhut et al. | 2/69 |

FOREIGN PATENT DOCUMENTS

| | | | |
|---|---|---|---|
| 2835412 | 2/1980 | Fed. Rep. of Germany | 428/246 |
| 1142494 | 2/1969 | United Kingdom | 264/321 |

OTHER PUBLICATIONS

"Cozy Quip" advertising brochure (no date).
"Without Fire or Shelter", Phillips Corporation, 1984.
"Keep Warm to Enjoy Winter", The Herald, Provo, Utah, p. 13, 11/29/84.
"The Mother Earth News", 91, pp. 160, 161, Jan./Feb. 1985.
Fieldbook, Boy Scouts of America, 1984, pp. 65-67, 76-89, 331-335.

*Primary Examiner*—William J. Van Balen
*Attorney, Agent, or Firm*—Nixon & Vanderhye

[57] ABSTRACT

A cold weather garment system includes an upper body garment and a lower body garment. Each garment has three layers, an outer wind resistant shell fabric, an inner loosely knit or woven lining fabric, and a non-flat foam layer between the fabric layers. The face of the foam layer abutting the inner lining fabric is convoluted, having peaks and valleys. The peaks are disposed in a grid-like arrangement, with ridges between the peaks, and four peaks surrounding a valley, and four valleys surrounding a peak. The foam is open cell polyurethane or polyether foam, and has a thickness of at least ½ inch, and preferably about one inch. The thickness of the valley portions of the foam is about ½ that of the peak portions. The convoluted form of the foam increases flexibility and reduces material and weight, and provides added surface area for moisture transfer.

20 Claims, 6 Drawing Figures 4,690,847

COLD WEATHER GARMENT STRUCTURE

BACKGROUND AND SUMMARY OF THE INVENTION

A known cold weather garment system which has been proven effective over the last decade and a half, is commonly known as the Phillips system. This system typically includes an upper body garment and a lower body garment, the single garments providing all the necessary cold weather protection for a human being's body, legs, and arms (other equipment being worn on the feet, hands, and head). Such a system includes an outer fabric of military camouflage nylon or the like, an inner lining fabric of loosely knit or woven construction, and an approximately one inch layer of open cell foam disposed between the inner and outer fabrics, and connected to the fabrics by stitching formed at the edges (and elsewhere if required) of the garment.

While the Phillips system has been very useful and effective for many cold weather situations, it is known to have relatively poor wind resistance. However, its poor wind resistance characteristics can be overcome by utilizing as the outer or shell fabric a high density woven fabric, the fabric woven from fine denier multifilament polyester yarn or the like. Also, it is desirable to enhance the properties of the garments in a number of other ways, as long as the warmth and moisture transport properties thereof are not adversely affected.

According to the present invention, a simple change in the construction of the Phillips system cold weather garments results in a number of advantages. According to the present invention, by utilizing as the foam layer a slab of foam having a first face and having a second face that is convoluted, a number of advantages can be achieved. For instance, utilizing the foam layer according to the invention one is able to increase the flexibility of the garment, and reduce the amount of material and weight of the garment. Also, since added surface area is provided by the convoluted face, moisture transfer during sweating by the wearer is enhanced. This is all accomplished without a decrease in the warmth retention properties of the garment, and in fact the moisture transport capabilities thereof are actually increased.

The convoluted foam sheet used according to the present invention preferably includes a flat face as the first face thereof. The convoluted face abuts the inner lining of the garment, while the flat face abuts the other fabric. While the convoluted face may take a number of different forms, it preferably basically has a form like that of an egg carton, having peaks and valleys, with the peaks disposed in a generally grid-like arrangement, with ridges between the peaks, and with four peaks surrounding a valley, and vice-versa. The foam preferably is about one inch thick, that is, the distance between the flat face and each peak is about one inch, while the distance between the flat face and each valley is about half of that (that is, about ½ inch). The foam is preferably of the same type as used in the Phillips system, being an open cell foam of polyurethane, polyether, or the like.

It is the primary object of the present invention to provide an improved cold weather garment system. This and other objects of the invention will become clear from an inspection of the detailed description of the invention, and from the appended claims.

DETAILED DESCRIPTION OF THE DRAWINGS

Figure 1:
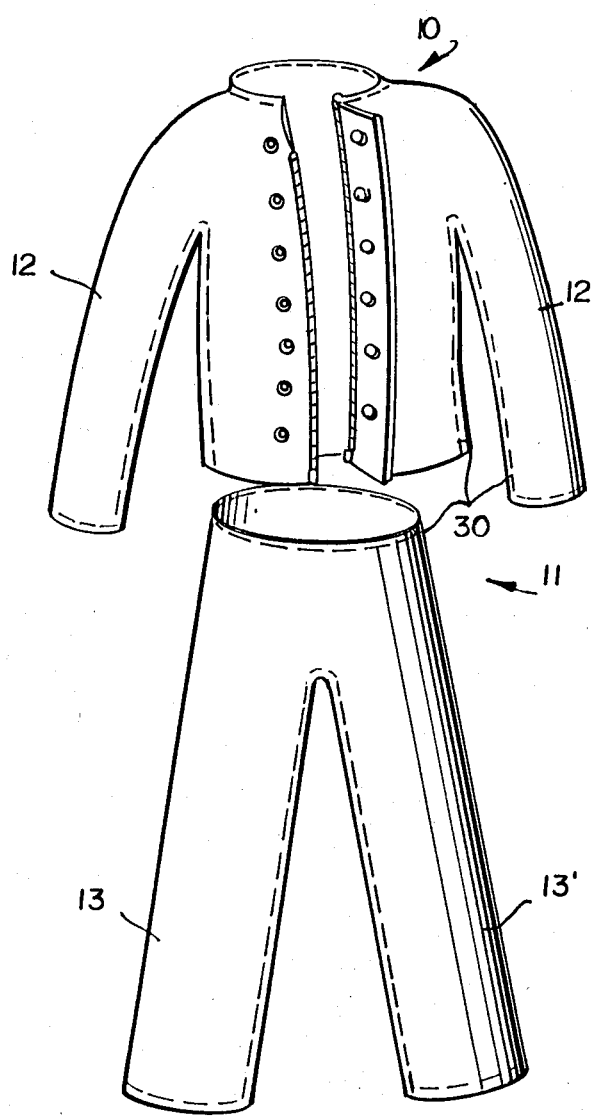
FIG. 1 is a schematic perspective view of exemplary upper body garment and lower body garment according to the present invention.

Exemplary cold weather garments according to the invention are illustrated schematically in FIG. 1, an upper body garment being illustrated by reference numeral 10, and the lower body garment by reference numeral 11. The upper body garment 10 protects the upper part of the wearer's body, and has arm portions 12 which cover the wearer's arms. The lower body garment 11 protects the lower portion of the wearer's body, and includes leg portions 13. Utilizing the garments 10, 11, the wearer needs not other garments in order to provide sufficient cold weather protection for the wearer's body, arms, and legs, although additional garments will be utilized to protect the wearer's hands, feet, and head. While no other additional garments are necessary for cold weather protection, the wearer can, if desired, wear underwear, or like garments, although it is necessary that the wearer avoid wearing any other type of garment (whether inner or outer) which has poor moisture vapor transmission properties.

Figure 2:
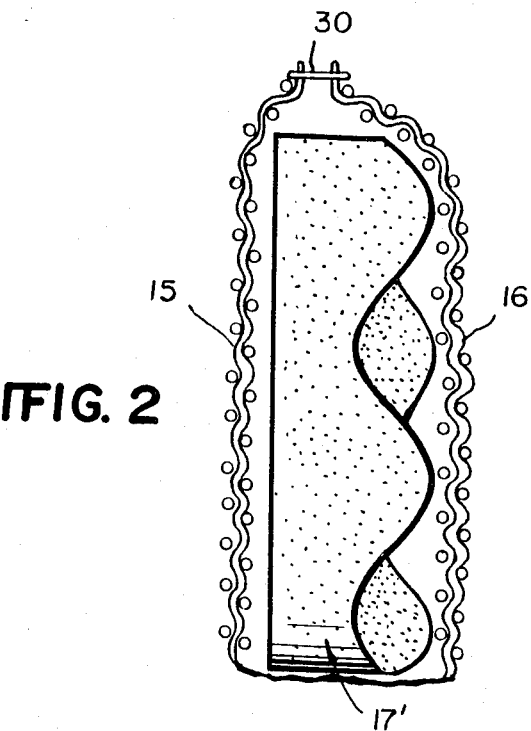
FIG. 2 is a side view of a portion of one of the garments of FIG. 1, with the fabric layers shown in section, and the foam shown in elevation.
Figure 6:
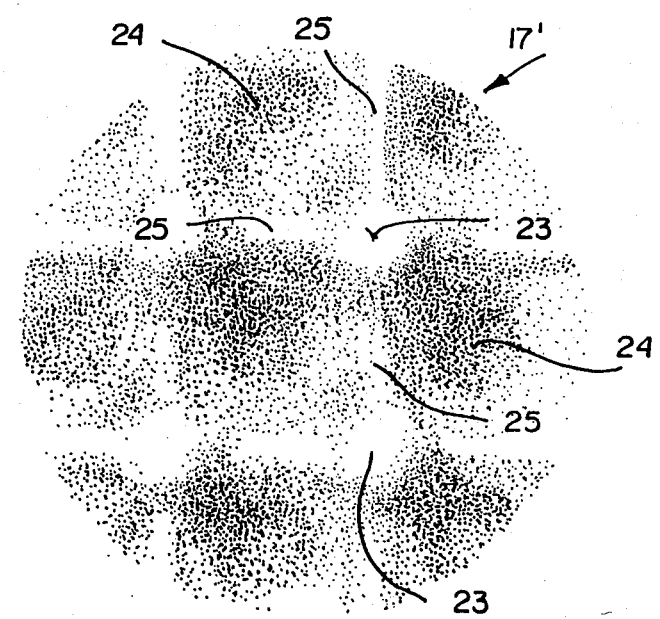
FIGS. 5 and 6 are side cross-sectional, and top plan views, respectively, of the convoluted foam of FIG. 4.

The construction of each of the garments 10, 11, is illustrated in FIG. 2, each of the garments comprising (or consisting of) three layers, comprising an outer or shell fabric layer 15, an inner fabric layer 16, and a layer of foam 17' disposed between the fabric layers 15, 16.

The outer fabric layer 15 is the component of the garment which provides desired wind resistance. The fabric 15 may be any suitable fabric which has air permeability of less than 15 cubic feet per minute per square foot at 0.5 inches head of water, and preferably has less than 10 ft$^3$/min./ft$^2$. Despite its low air permeability, the fabric 15 must has good moisture vapor transmission, that is it should be at least about 1,000 grams per square meter per 24 hours.

Figure 3:
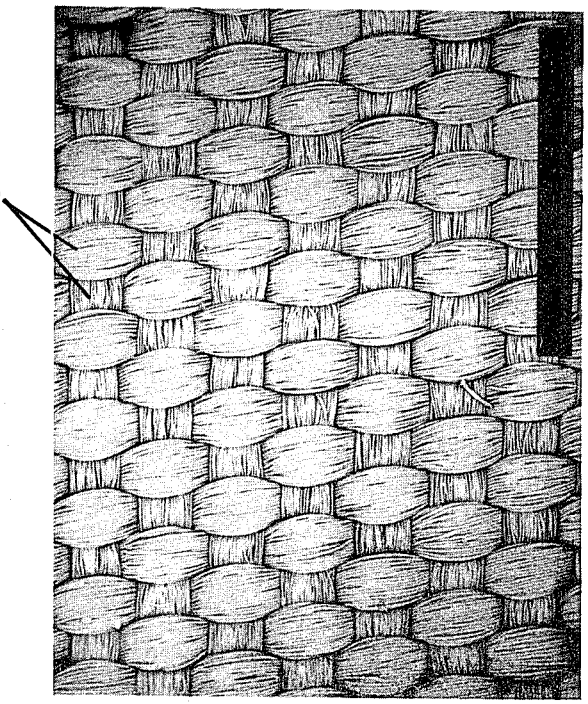
FIG. 3 is a microphotograph, at 50 times magnification, showing an exemplary construction of a shell fabric that may be provided in the garments of FIGS. 1 and 2.
Figure 4:
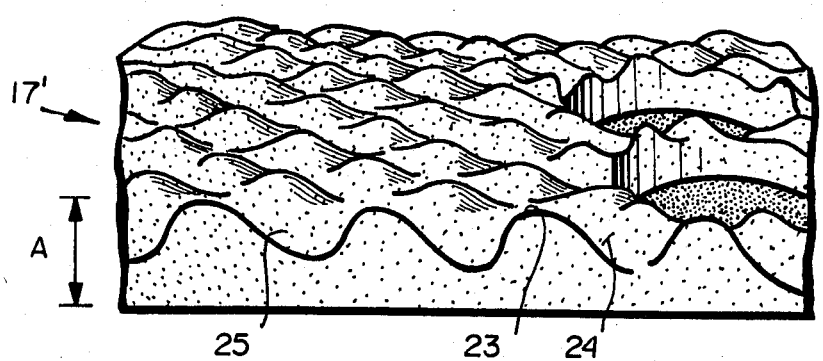
FIG. 4 is a top perspective view of a preferred embodiment of convoluted foam utilized in the garments according to the invention.
Figure 5:
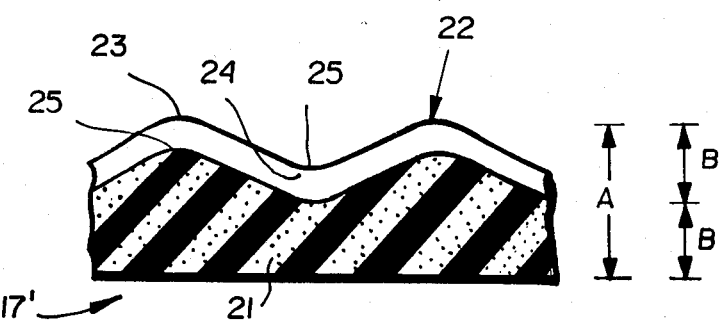

One particular fabric 15 which has the desired air permeability and moisture vapor transmission properties, comprises a high density woven fabric, woven from fine denier, multi-filament, synthetic yarn (preferably polyester yarn). Such a fabric is available commercially from Burlington Industries, Inc. under the trademark "VERSATECH". A piece of VERSATECH fabric, at a magnification of 50 times, is illustrated in the photograph of FIG. 3. Note in particular the fine denier multi-filament yarns 19, which make up the weave of the fabric.

The inner fabric 16 may be of any suitable conventional type. For instance both knit or woven fabrics can be utilized. The major purpose of the inner fabric 16 is just to prevent the foam 17' from directly contacting the body, and allowing free moisture vapor transmission from the body to the foam. One particular fabric that is especially suitable for the inner lining 16 is a loosely knit nylon or polyester tricot fabric.

The foam 17' of the garment is an open cell soft and flexible polyether or polyurethane foam, non-flat foam sheet. The foam layer 17' has a thickness of at least $\frac{1}{2}$ inch, and preferably a thickness of at least about $\frac{3}{4}$ of an inch, and desirably a thickness of about one inch. Instead of the foam having a uniform thickness, as is conventional in the Phillips system, it is advantageous to provide the foam having a convoluted construction, as illustrated in FIGS. 2 and 4 through 6.

The convoluted foam 17' of FIGS. 2 and 4 through 6 has a first face, 21, which is adapted to abut the outer fabric 16, and a second, convoluted face 22, having peaks 23 and valleys 24, the peaks 23 adapted to abut the inner lining fabric 16. For the particular embodiment illustrated in the drawings, note that the peaks 23 are disposed in a substantially linear grid-like arrangement, with ridges 25 interconnecting the peaks 23 with four peaks 23 and associated ridges 25 surrounding each valley 24. In the preferred embodiment of the invention, the entire thickness A (see FIG. 5 in particular) of the foam layer is about one inch, while the thickness of the base of the foam layer 17', and the spacing between the bottom of each valley and the top of each peak, are each approximately of the dimension B, which is approximately $\frac{1}{2}$ inch. One such suitable convoluted foam is commercially available from Technical Foam Products of Charlotte, N.C.

The convoluted foam layer 17' has a number of advantages. It increases the flexibility and reduces the material and weight of the entire garment. Also, the peak and valley surface 22 provides added surface area for moisture transfer during sweating since moisture transfer includes permeation of water vapor.

The three layers of the garments according to the invention are connected together by suitable connecting means to form the garment. A preferred form that the connecting means takes is illustrated schematically in FIGS. 1 and 2, and comprises stitching 30, the stitching 30 being provided at the edges of the garment for stitching the outer fabric 15 and inner lining 16 to the foam layer 17. Stitching 30 is provided wherever necessary in order to construct a particular garment. If desired, an additional ridge of material may be provided at the edges of the garment at the area of the stitching.

It will thus be seen that according to the present invention a method and garment system have been provided for protecting a human from cold weather, even under windy conditions. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent garments and systems.

What is claimed is:

1. A cold-weather garment comprising: an interior lining fabric; an outer fabric; a layer of open cell foam at least $\frac{1}{2}$ inch thick between the interior lining fabric and the outer fabric; and the lining, foam layer, and outer fabric connected together by connecting means to form a garment; and wherein:

said foam comprising a first face, and a second, convoluted, face, said convoluted face including peaks and valleys, and said convoluted face disposed in abutting relationship with the interior lining fabric.

2. A garment as recited in claim 1 wherein the second face is substantially flat and is in abutting relationship with the outer fabric.

3. A garment as recited in claim 2 wherein said foam is selected from the group consisting of polyurethane and polyether foams.

4. A garment as recited in claim 3 wherein the thickness of said foam from said first face to said valleys in approximately $\frac{1}{2}$ the thickness of said foam from said first face to said peaks.

5. A garment as recited in claim 4 wherein said foam layer has a thickness of about one inch.

6. A garment as recited in claim 5 wherein said convoluted face further comprises ridges disposed between said peaks, and wherein said peaks are disposed in a grid-like arrangement, with four peaks, and associated ridges, surrounding each valley, and four valleys surrounding each peak.

7. A garment as recited in claim 1 wherein the thickness of said foam from said first face to said valleys is approximately $\frac{1}{2}$ the thickness of said foam from said first face to said peaks.

8. A garment as recited in claim 1 wherein said foam layer has a thickness of about one inch.

9. A garment as recited in claim 1 wherein said convoluted face further comprises ridges disposed between said peaks, and wherein said peaks are disposed in a grid-like arrangement, with four peaks, and associated ridges, surrounding each valley, and four valleys surrounding each peak.

10. A garment as recited in claim 1 wherein said foam is selected from the group consisting of polyurethane and polyether foams.

11. A cold-weather garment consisting of: an interior lining fabric; an outer fabric; a layer of open cell foam at least $\frac{1}{2}$ inch thick between the interior lining fabric and the outer fabric; and the lining, foam layer, and outer fabric connected together by connecting means to form a garment; and wherein:

said layer of foam sheet comprises a non-flat foam sheet, said non-flat foam sheet having increased flexibility and reduced material and weight, and having added surface area for moisture transfer during sweating of the wearer, compared to a flat foam sheet.

12. A garment as recited in claim 11 wherein said non-flat foam sheet comprises a sheet having a first, flat face, and a second, convoluted face.

13. A garment as recited in claim 12 wherein said convoluted face is in abutting engagement with said inner lining, while the flat face thereof is in abutting engagement with said outer fabric.

14. A garment as recited in claim 13 wherein said foam is selected from the group consisting of polyurethane and polyether foams.

15. A garment as recited in claim 14 wherein the thickness of said foam from said first face to said valleys is approximately $\frac{1}{2}$ the thickness of said foam from said first face to said peaks.

16. A garment as recited in claim 15 wherein said foam layer has a thickness of about one inch.

17. A garment as recited in claim 16 wherein said convoluted face further comprises ridges disposed between said peaks, and wherein said peaks are disposed in a grid-like arrangement, with four peaks, and associated ridges, surrounding each valley, and four valleys surrounding each peak.

18. A garment as recited in claim 11 wherein said convoluted face further comprises ridges disposed between said peaks, and wherein said peaks are disposed in a grid-like arrangement, with four peaks, and associated ridges, surrounding each valley, and four valleys surrounding each peak.

19. A garment as recited in claim 11 wherein said foam layer has a thickness of about one inch.

20. A garment as recited in claim 11 wherein the thickness of said foam from said first face to said valleys is approximately ½ the thickness of said foam from said first face to said peaks.

* * * * *